Nov. 21, 1950     W. H. CHURCHILL     2,531,352
TURNABLE T-MEMBER TYPE MOLDING FASTENER
Filed Feb. 1, 1947
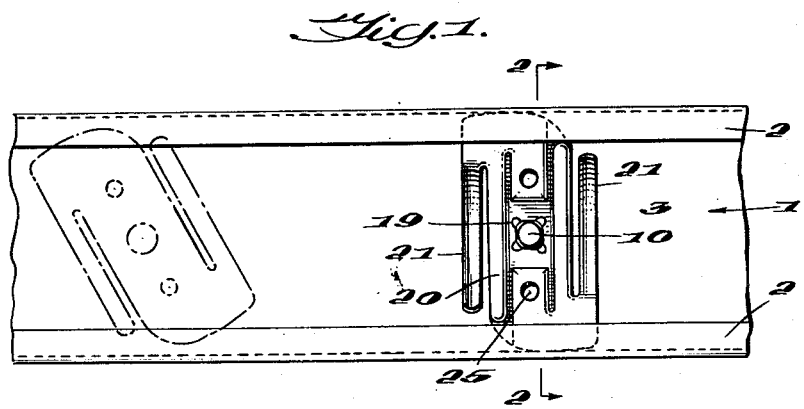
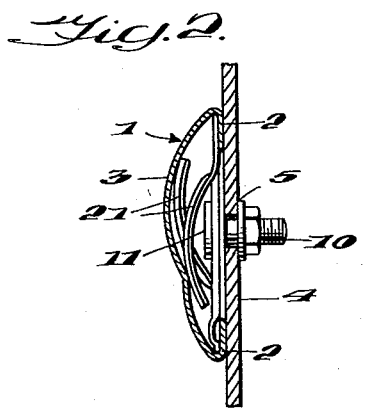 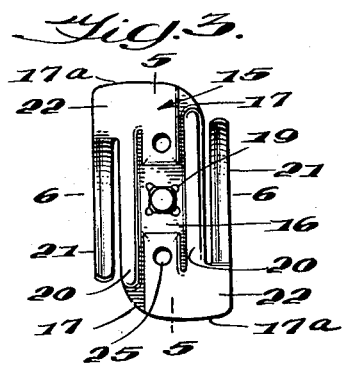
 
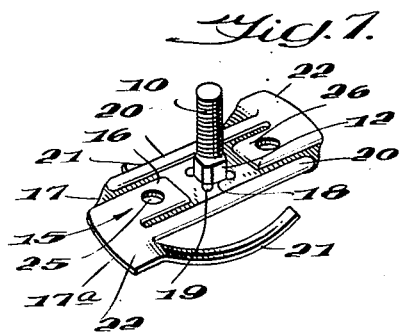 
WILMER H. CHURCHILL,
By John Todd
Attorney Patented Nov. 21, 1950

2,531,352

UNITED STATES PATENT OFFICE 2,531,352

TURNABLE T-MEMBER TYPE MOLDING FASTENER

Wilmer H. Churchill, Saugus, Mass., assignor to United-Carr Fastener Corporation, Cambridge, Mass., a corporation of Massachusetts Application February 1, 1947, Serial No. 725,911

3 Claims. (Cl. 24—73)

The present invention relates to molding fasteners such as are employed for securing a channel molding to an aperture support and particularly to molding fasteners of the turnable T-bolt type and aims generally to improve existing fasteners of that type.

Heretofore turnable T-bolt molding fasteners have included a T-head composed of a cold rolled steel plate head and a high carbon steel spring member for providing the desired tension between the head and molding. Such construction had the disadvantage of being relatively heavy and expensive.

The present invention has for its primary aim and object to simplify, cheapen and reduce the weight of the T-bolt fastener.

A further object of the invention is the provision of an improved T-bolt fastener having a head made of a single piece of suitable material, for example, high carbon steel, which combines the functions of providing a strong supporting head as well as a tensioning means.

Other aims and objects of the invention will be apparent to persons skilled in the art to which the invention relates from a consideration of the accompanying drawings and annexed specification illustrating and describing a preferred embodiment of the invention.

In the drawings—

Fig. 1 is an inside elevation of a molding strip with fasteners of the invention applied thereto;

Fig. 2 is a transverse sectional view of the molding strip and fastener as taken on the line 2—2 of Fig. 1;

Fig. 3 is a plan view of the fastener embodying the invention;

Fig. 4 is an edge view of the fastener shown in Fig. 3;

Fig. 5 is a longitudinal sectional view through the fastener as taken on the line 5—5 of Fig. 3;

Fig. 6 is a transverse sectional view of the fastener as taken on line 6—6 of Fig. 3; and Fig. 7 is a detail perspective view of the fastener.

Referring to the drawings, the reference numeral 1 designates a molding of suitable cross-sectional shape which conveniently is of hollow channelled construction provided with inwardly directed spaced flanges 2 spaced laterally from the face 3 of the molding. The molding 1 is designed to be attached to a supporting part 4, apertured at 5 by means of a fastener of the present invention. The contour of the outer face of the molding may be irregular as shown, wherein the channels between the flanges 2 and adjoining portions of the face 3 are of different depths.

As herein illustrated, the fastener of the present invention is of the T-bolt type having a threaded shank 10 provided with an enlarged head 11 at one end, a portion of the shank between the headed end 11 and the threaded portion 10 being squared or polygonal shaped to non-rotatably receive the head 15 of the fastener.

The head 15 of the fastener is advantageously formed of a single piece of thin sheet metal, for example, carbon steel, which may be suitably shaped and then hardened, as by heat-treating, to provide adequate strength combined with lightness in weight.

The head 15 preferably comprises a body portion 16 of suitable width to snugly fit in the channel of the molding, and may be of general elongated rectangular form having diagonally opposite rounded corners 17 to facilitate rotating the head 15 in the channel. The head is preferably provided with a rectangular aperture 18 to receive the squared portion 12 of the shank, the corners of which may be swaged or otherwise upset as at 19 over the adjoining portion of the body 16 to non-rotatably secure the head 15 to the bolt.

The elongated rectangular body 16 of the head 15 is advantageously made of very thin sheet metal, for example, carbon steel, for lightness in weight. This body 16 may be reinforced transversely by outwardly pressed ribs 20 disposed longitudinally of the body and spaced from opposite sides of the bolt.

Tensioning means is in the form of spring arms 21 are provided preferably on opposite sides of the body 16 and these arms 21 preferably extend from the body in opposite directions, each arm 21 being joined to a lateral extension 22 beyond a rib 20 so that the spring arm is spaced from the rib 20 and free to move independently thereof, its free end extending toward a rounded body corner 17. The spring arms 21 are curved downwardly to a plane spaced from the body 16 and have upwardly turned ends for readly slidable bearing engagement with the inner wall of the molding face 3, and as shown in Fig. 6, and the arms 21 are ribbed or made transversely arcuate to impart added strength thereto. As will be noted in Fig. 2, each arm 21 bears against different sections of the face 3 even though it be of irregular shape, and places the head 15 under sufficient tension that it will grip the inner faces of the flanges 2 when turned to locked position, shown in Fig. 1.

The fastener is initially fitted into a channel molding 1 by initially disposing it in an oblique position as shown in light lines, Fig. 1, and sliding longitudinally in the channel to a desired position. The fastener is then frictionally clamped in desired position by rotating the head about the axis of the bolt 10 as by means of a spanner wrench engaged in holes 25 on opposite sides of the bolt and disposed on a center line of the body portion 10. Such rotation would be in a direction toward the rounded corner 17, i. e. in a clockwise direction, as illustrated in Fig. 2. Rotation of the head within the channel of the molding is facilitated by the rounded corner. The end edge 17a of the body 16 extends across the extension 22 and serves as a stop to limit rotation of the head to a degree beyond that at which the spring arms 21 are perpendicular to the flanges 2.

The body 16 of head 15 may be reinforced by forming a rib 26 above the body, surrounding the aperture 25; the top of the rib being preferably in the plane of the extension 22. Thus the rib 26 and extension 22 present molding flange-bearing portions disposed transversely of the head when the arms 21 are disposed longitudinally of the head 15 and present tensioning means engaging the irregular face 3 of the molding.

It will be appreciated by persons skilled in the art that the fastener of the present invention is simple, economical of manufacture and extremely light in weight as compared with existing T-bolt fasteners.

Although I have illustrated one preferred embodiment of the invention, I do not intend to be limited thereby as the scope of the invention is best defined in the appended claims.

I claim:

1. A molding fastener comprising a support-engaging shank, a molding-engaging head secured adjacent one end thereof and disposed in a plane substantially normal to the axis of said shank, said head being of one-piece construction and including an elongated plate-like body connected to said shank and providing molding-engaging portions adjacent opposite ends for engaging a pair of spaced portions of the inner surfaces of a molding, said body having a width less than the distance between inturned flanges of a molding with which it is to be assembled, and a length greater than this, an extension integrally connected to an edge of said body, and a relatively long slender resilient molding-contacting arm connected to said extension, said arm being disposed at an acute angle to an edge of said body for tensioned engagement with a third portion of the inner surface of said molding to tension said molding-engaging portions against said pair of spaced portions of the inner surface of the molding whereby the fastener is secured in position in the molding by tensioned engagement of the parts thereof with spaced portions of the interior surface of the molding.

2. A molding fastener comprising a support-engaging shank, a molding-engaging head secured adjacent one end thereof and disposed in a plane substantially normal to the axis of said shank, said head being of one-piece construction and including an elongated plate-like body connected to said shank and providing molding-engaging portions adjacent opposite ends for engaging a pair of spaced portions of the inner surface of a molding, said body having a width less than the distance between inturned flanges of a molding with which it is to be assembled and a length greater than this, a pair of resilient molding contacting arms connected to opposite side edges of said body adjacent the ends thereof, said arms extending toward opposite ends of said body and being disposed at acute angles to said edges for tensioned engagement with spaced portions of the inner surface of said molding to tension said molding-engaging portions against said pair of spaced portions of the inner surface of the molding whereby the fastener is secured in position in the molding by tensioned engagement of the parts thereof with spaced portions of the interior surface of the molding.

3. A molding fastener comprising a support-engaging member, a molding-engaging head secured adjacent one end thereof and disposed in a plane generally normal to the axis of said shank, said head being of one-piece construction and including an elongated plate body connected to said shank, lateral extensions integrally connected to opposite side edges of said body adjacent the ends thereof, and a pair of resilient molding-contacting arms connected to said extensions, said arms extending toward opposite ends of said body at acute angles to the surface thereof in planes substantially parallel to said edges.

WILMER H. CHURCHILL.

REFERENCES CITED

The following references are of record in the file of this patent:

UNITED STATES PATENTS

| Number | Name | Date |
|---|---|---|
| 2,068,562 | Murphy | Jan. 19, 1937 |
| 2,068,633 | Upham | Jan. 19, 1937 |
| 2,198,186 | Tinnerman | Apr. 23, 1940 |
| 2,221,124 | Wiley | Nov. 12, 1940 |